United States Patent
Nagaoka et al.

(10) Patent No.: US 7,451,593 B2
(45) Date of Patent: Nov. 18, 2008

(54) EXHAUST GAS CLEANING METHOD AND EXHAUST GAS CLEANING SYSTEM

(75) Inventors: Daiji Nagaoka, Fujisawa (JP); Masashi Gabe, Fujisawa (JP); Takayuki Sakamoto, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 8 days.

(21) Appl. No.: 10/554,931

(22) PCT Filed: Jun. 22, 2004

(86) PCT No.: PCT/JP2004/008734

§ 371 (c)(1), (2), (4) Date: Oct. 31, 2005

(87) PCT Pub. No.: WO2004/113703

PCT Pub. Date: Dec. 29, 2004

(65) Prior Publication Data

US 2007/0022742 A1   Feb. 1, 2007

(30) Foreign Application Priority Data

Jun. 23, 2003  (JP) .............................. 2003-178079

(51) Int. Cl.
*F01N 3/00* (2006.01)
(52) U.S. Cl. .............................. 60/295; 60/274; 60/278; 60/285; 60/297; 60/301
(58) Field of Classification Search ................... 60/274, 60/278, 285, 286, 295, 297, 301, 311
See application file for complete search history.

(56) References Cited

U.S. PATENT DOCUMENTS

| 5,746,989 A | * | 5/1998 | Murachi et al. | ........... 423/213.7 |
| 5,974,791 A | * | 11/1999 | Hirota et al. | ................. 60/276 |
| 6,304,815 B1 | * | 10/2001 | Moraal et al. | ............... 701/115 |

(Continued)

FOREIGN PATENT DOCUMENTS

| JP | 2000-303826 | 10/2000 |
| JP | 2002-295244 | 10/2002 |
| JP | 2003-65117 | 3/2003 |

(Continued)

*Primary Examiner*—Binh Q. Tran
(74) *Attorney, Agent, or Firm*—Staas & Halsey LLP

(57) ABSTRACT

An exhaust gas cleaning method capable of maintaining an optimum NOx purification ratio in the continuously regenerative range of DPF in an exhaust gas cleaning system (1) having an NOx purification function and a PM purification function combined with each other and the exhaust gas cleaning system (1). In the exhaust gas cleaning system (1), NOx purification by an NOx occlusion/reduction type catalyst (42) and PM purification by a continuous regeneration type DPF (41) are preformed for exhaust gas from an internal combustion engine. When the temperature (Tent) of the exhaust gas flowing in the DPF (41b) exceeds the self-burning temperature (Tent0) of PM and the differential pressure increasing rate (dP) of a differential pressure across the DPF (41b) exceeds a specified determination value (dP0), at least either of a control to reduce the frequency of enriching the exhaust gas and a control to reduce the degree of richness is performed in a catalyst regenerative control for regenerating the NOx occlusion/reduction type catalyst (42).

14 Claims, 4 Drawing Sheets

U.S. PATENT DOCUMENTS

| | | | |
|---|---|---|---|
| 6,490,857 B2 * | 12/2002 | Sasaki | 60/278 |
| 6,901,747 B2 * | 6/2005 | Tashiro et al. | 60/286 |
| 6,915,629 B2 * | 7/2005 | Szymkowicz | 60/289 |
| 7,040,086 B2 * | 5/2006 | Kitahara et al. | 60/285 |
| 7,137,246 B2 * | 11/2006 | van Nieuwstadt et al. | 60/295 |
| 7,159,389 B2 * | 1/2007 | Miura | 60/295 |

* cited by examiner

EXHAUST GAS CLEANING METHOD AND EXHAUST GAS CLEANING SYSTEM

This application is based on and hereby claims priority to PCT Application No. PCT/JP2004/008734 flied on Jun. 22, 2004 and Japanese Application No. 2003-178079 filed on Jun. 23, 2003, the contents of which are hereby incorporated by reference.

TECHNICAL FIELD

The present invention relates to an exhaust gas cleaning method and an exhaust gas cleaning system for performing NOx purification by an NOx occlusion/reduction type catalyst and PM purification by a continuous regeneration type DPF for exhaust gas from an internal combustion engine such as a diesel engine.

BACKGROUND ART

There have been stricter regulations each year on amounts of emissions of NOx (nitrogen oxides) and particulate matter (hereinafter abbreviated as PM) emitted from a diesel engine, along with CO (carbon monoxide), HC (hydrocarbon), and the like. The stricter regulations have made it impossible to meet regulatory values only by improving the engine. Thus, there has been employed a technology of reducing the above-described substances emitted from the engine by installing an exhaust gas treatment system.

Meanwhile, for NOx, a number of NOx purification catalysts have been developed. Moreover, for PM, a filter called a diesel particulate filter (hereinafter abbreviated as DPF) has been developed.

One of the NOx purification catalysts is an NOx occlusion/reduction type catalyst. This NOx occlusion/reduction type catalyst is formed by carrying catalytic metal and an NOx occlusion material having an NOx occlusion function on a porous catalyst coat layer such as alumina ($Al_2O_3$). The catalytic metal is platinum (Pt) or the like, which has an oxidation function for NOx. Moreover, the NOx occlusion material is any one of or a combination of some of the following: alkali metal such as sodium (Na), potassium (K) and cesium (Cs); alkali earth metal such as calcium (Ca) and barium (Ba); rare earth such as yttrium (Y) and lanthanum (La); and the like. The NOx occlusion/reduction type catalyst exerts two functions which are NOx occlusion and NOx emission/purification, depending on an $O_2$ (oxygen) concentration in the exhaust gas.

First, under an exhaust gas condition with a high $O_2$ concentration in the exhaust gas (a lean air fuel ratio state), such as a normal operating state of the diesel engine, a lean-burn gasoline engine or the like, the oxidation function of the catalytic metal allows released NO (nitrogen monoxide) to be oxidized by $O_2$ contained in the exhaust gas, thereby generating $NO_2$ (nitrogen dioxide). This $NO_2$ is occluded in the form of a chloride by the NOx occlusion material. Therefore, the exhaust gas is cleaned.

However, if the occlusion of NOx is continued, the NOx occlusion material such as barium is changed into a nitrate and gradually saturated to lose the function of occluding $NO_2$. Therefore, excessive concentration combustion is performed by changing engine operating conditions, and thereby rich spike gas is generated and supplied to the catalyst. This rich spike gas is exhaust gas having a low $O_2$ concentration, a high CO concentration, and a high exhaust gas temperature.

In the rich air fuel ratio state of the exhaust gas described above, the NOx occlusion material, which has been changed into the nitrate by occluding $NO_2$, releases the occluded $NO_2$ and is changed back into its original form such as barium. Since no $O_2$ exists in the exhaust gas, the released $NO_2$ is reduced on the catalytic metal by use of CO, HC and $H_2$ in the exhaust gas as a reducing agent, and is converted into $N_2$, $H_2O$ and $CO_2$. Therefore, the exhaust gas is cleaned.

However, in the case of using the NOx occlusion/reduction type catalyst, the catalyst cannot burn soot components in the PM by itself. Consequently, it is required to combine the catalyst with the DPF or to integrate an NOx purification function of the NOx occlusion/reduction type catalyst with a PM purification function of the DPF.

As one of the integration described above, an exhaust gas cleaning device for an internal combustion engine has been proposed in Japanese patent application Kokai publication No. 1994-159037. Specifically, the exhaust gas cleaning device is intended to provide a means for reducing an amount of energy supplied from the outside in order to regenerate a DPF, and for facilitating ignition of collected PM. In this device, the DPF and an NOx absorbent (the NOx occlusion/reduction type catalyst) are disposed in positions where heat can be transmitted to each other. To be more specific, the DPF carries the NOx absorbent.

However, in an exhaust gas cleaning system including the NOx purification function of the NOx occlusion/reduction type catalyst and the PM purification function of the DPF, what matter is a balance between an NOx purification rate and a PM accumulation amount.

Specifically, in order to increase the NOx purification rate in a high load engine operating range at an exhaust gas temperature at which the PM is self-ignited as shown in FIG. 6, a frequency of rich combustion by which NOx is released and reduced may be increased. However, since the operating range described above is a high combustion temperature range, a large amount of PM is generated in the rich combustion. Note that the exhaust gas temperature in the self ignition described above, although influenced by a catalyst carried by the DPF, is approximately 300° C. to 400° C. or higher.

In this case, if the amount of PM generated is less than a rate at which the PM is self-ignited and burnt, the NOx purification rate is reduced although no PM is accumulated in the DPF. Meanwhile, in the case where the amount of PM generated is increased through increasing richness (a frequency, a degree of richness, an amount of a reducing agent supplied, and the like) in order to increase the NOx purification rate, an amount of PM accumulated in the DPF is gradually increased. If the PM accumulation amount exceeds its limits, there arises a risk of abnormal combustion and erosion attributable thereto. Thus, even if the engine operating range is the high load range, it is required to regenerate the DPF by forcibly burning the PM.

FIG. 7 shows a relationship between the NOx purification rate and the PM accumulation amount (a differential pressure increasing rate). When the richness is reduced by a catalyst regenerative control for recovering the NOx purification rate of the NOx occlusion/reduction type catalyst, the amount of PM generated becomes smaller than the amount of PM burnt (the differential pressure increasing rate is negative). However, the NOx purification rate is also reduced. Meanwhile, when the NOx purification rate is increased through increasing the richness, the amount of PM generated becomes larger than the amount of PM burnt (the differential pressure increasing rate is positive) although the NOx purification rate increases.

SUMMARY OF THE INVENTION

The present invention is made to solve the foregoing problems. It is an object of the present invention to provide an exhaust gas cleaning method capable of maintaining an optimum NOx purification rate in a continuously regenerative range of DPF in an exhaust gas cleaning system having an NOx purification function by an NOx occlusion/reduction type catalyst and a PM purification function by a continuous regeneration type DPF combined with each other and to provide the exhaust gas cleaning system.

An exhaust gas cleaning method to achieve the foregoing object is a method in an exhaust gas cleaning system which performs NOx purification by an NOx occlusion/reduction type catalyst and PM purification by a continuous regeneration type DPF for exhaust gas from an internal combustion engine, and includes a temperature sensor which detects a temperature of the exhaust gas flowing into the DPF, a differential pressure sensor which detects a differential pressure across the DPF, and a control unit which calculates a differential pressure increasing rate per unit time of the DPF, the method being configured to reduce richness in a richness control performed in a catalyst regenerative control for regenerating the NOx occlusion/reduction type catalyst when the temperature of the exhaust gas detected by the temperature sensor is not less than a self-burning temperature of PM and the differential pressure increasing rate is not less than a specified determination value thereof Alternatively, an exhaust gas cleaning method of the present invention is a method in an exhaust gas cleaning system which performs NOx purification by an NOx occlusion/reduction type catalyst and PM purification by a continuous regeneration type DPF for exhaust gas from an internal combustion engine, and includes a temperature sensor which detects a temperature of the exhaust gas flowing into the DPF, a differential pressure sensor which detects a differential pressure across the DPF, first and second NOx concentration sensors which detect NOx concentrations across the NOx occlusion/reduction type catalyst, and a control unit which calculates a differential pressure increasing rate per unit time of the DPF and calculates an NOx purification rate from the NOx concentrations across the NOx occlusion/reduction type catalyst, the method being configured to increase richness in a richness control performed in a catalyst regenerative control for regenerating the NOx occlusion/reduction type catalyst when: the temperature of the exhaust gas detected by the temperature sensor is not less than a self-burning temperature of PM; the differential pressure increasing rate is not more than a specified determination value thereof; and the NOx purification rate is than a specified determination value thereof.

The foregoing exhaust gas cleaning method is configured to reduce the richness in the richness control performed in the catalyst regenerative control for regenerating the NOx occlusion/reduction type catalyst when: the temperature of the exhaust gas detected by the temperature sensor is not less than the self-burning temperature of PM; and the differential pressure increasing rate not less than the specified determination value thereof.

The reduction in the richness described above is performed by reducing a frequency of enrichment by making an interval between the richness controls longer than that between normal richness controls. Alternatively, the reduction in the richness described above is performed through reducing a degree of richness in the following manner. Specifically, the degree of richness is reduced by setting a target oxygen concentration to be relatively low in performing the richness control, thereby reducing an amount of a reducing agent supplied to obtain a high air fuel ratio (A/F) of the exhaust gas and a low excess air ratio (γ). Alternatively, the reduction in the richness is performed by the both described above.

Moreover, the increase in the richness described above is performed by increasing the frequency of enrichment by making the interval between the richness controls shorter than that between normal richness controls. Alternatively, the increase in the richness described above is performed through increasing the degree of richness in the following manner. Specifically, the degree of richness is increased by setting the target oxygen concentration to be relatively high in performing the richness control, thereby increasing the amount of the reducing agent supplied to obtain a low air fuel ratio of the exhaust gas and a high excess air ratio. Alternatively, the increase in the richness is performed by the both described above.

According to the exhaust gas cleaning method having the configurations described above, it is possible to perform an optimum richness control capable of suppressing accumulation of the PM while maintaining an optimum NOx purification rate in an engine operating state of such a high load range that the PM is self-ignited.

Moreover, an exhaust gas cleaning system of the present invention is a system which performs NOx purification by an NOx occlusion/reduction type catalyst and PM purification by a continuous regeneration type DPF for exhaust gas from an internal combustion engine. The system includes: a temperature sensor which detects a temperature of the exhaust gas flowing into the DPF; a differential pressure sensor which detects a differential pressure across the DPF; and a control unit which calculates a differential pressure increasing rate per unit time of the DPF. In the exhaust gas cleaning system, the control unit is configured to reduce richness of the exhaust gas in a richness control performed in a catalyst regenerative control for regenerating the NOx occlusion/reduction type catalyst when: the temperature of the exhaust gas detected by the temperature sensor is not less than a self-burning temperature of PM; and the differential pressure increasing rate is not less than a specified determination value thereof.

Alternatively, an exhaust gas cleaning system of the present invention is a system which performs NOx purification by an NOx occlusion/reduction type catalyst and PM purification by a continuous regeneration type DPF for exhaust gas from an internal combustion engine. The system includes: a temperature sensor which detects a temperature of the exhaust gas flowing into the DPF; a differential pressure sensor which detects a differential pressure across the DPF; first and second NOx concentration sensors which detect NOx concentrations across the NOx occlusion/reduction type catalyst; and a control unit which calculates a differential pressure increasing rate per unit time of the DPF and calculates an NOx purification rate from the NOx concentration across the NOx occlusion/reduction type catalyst. In the exhaust gas cleaning system, the control unit is configured to increase richness of the exhaust gas in a richness control performed in a catalyst regenerative control for regenerating the NOx occlusion/reduction type catalyst when: the temperature of the exhaust gas detected by the temperature sensor is not less than a self-burning temperature of PM; the differential pressure increasing rate is not more than a specified determination value thereof; and the NOx purification rate is less than a specified determination value thereof.

In the foregoing exhaust gas cleaning system, the control unit is configured to reduce the richness in the richness control performed in the catalyst regenerative control for regenerating the NOx occlusion/reduction type catalyst when: the temperature of the exhaust gas detected by the temperature sensor is not less than the self-burning temperature of PM; and the differential pressure increasing rate is not less than the specified determination value thereof.

According to the exhaust gas cleaning method and the exhaust gas cleaning system having the configurations described above, it is possible to perform an optimum richness control capable of suppressing accumulation of the PM while maintaining an optimum NOx purification rate in a high load range within which the PM is self-ignited.

Further, in the exhaust gas cleaning system, the continuous regeneration type DPF is any one of a continuous regeneration type DPF formed of an oxidation catalyst at the upstream side and a DPF at the downstream side; a continuous regeneration type DPF formed of a catalyst-provided DPF which carries an oxidation catalyst; and a continuous regeneration type DPF formed of a catalyst-provided DPF which carries both an oxidation catalyst and a PM oxidation catalyst.

The continuous regeneration type DPF, which is formed of the oxidation catalyst located at the upstream side and the DPF located at the downstream side, is a continuous regeneration type DPF called a CRT (continuously regenerating trap) type DPF. The oxidation catalyst at the upstream side oxidizes NO in the exhaust gas into $NO_2$. Since this $NO_2$ has an energy barrier smaller than that of $O_2$, PM collected by the DPF can be oxidized and removed at a low temperature.

Moreover, the continuous regeneration type DPF formed of the DPF carrying the oxidation catalyst oxidizes PM accumulated in the DPF by use of $NO_2$ generated by oxidation of NO. The continuous regeneration type DPF formed of the DPF carrying both the oxidation catalyst and the PM oxidation catalyst continuously regenerates PM accumulated in the DPF by subjecting PM to direct catalytic combustion by use of $O_2$ from a low temperature, in that the DPF is allowed to carry both the oxidation catalyst and the PM oxidation catalyst.

Furthermore, the foregoing exhaust gas cleaning system is configured to be any one of an exhaust gas cleaning system including an NOx reduction type catalytic converter and a continuous regeneration type DPF in an exhaust passage of the internal combustion engine, and an exhaust gas cleaning system including a continuous regeneration type DPF having a DPF carrying an NOx reduction type catalyst.

Particularly, if the catalyst-provided DPF is allowed to carry the NOx reduction type catalyst and thus the DPF and the catalyst are integrated, PM and NOx can be purified at the same time. Specifically, when the exhaust gas is in a lean air fuel ratio state during lean burn operation, NOx is occluded in the NOx occlusion material of the catalyst. PM is oxidized by active oxygen (O*) generated in the NOx occlusion and $O_2$ in the exhaust gas. Moreover, when the exhaust gas is in a rich air fuel ratio state during theoretical air fuel ratio combustion or excessive concentration air fuel ratio combustion to recover an NOx occlusion ability, NOx is released from the NOx occlusion material and reduced. At the same time, even in a state where there is a small amount of $O_2$ in the exhaust gas, PM is oxidized in the catalyst by active oxygen (O*) generated while NOx is reduced. According to the configuration described above, since the NOx occlusion/reduction type catalyst and the DPF carrying the catalyst are integrated, the system can be miniaturized and simplified.

Therefore, according to the exhaust gas cleaning method and the exhaust gas cleaning system of the present invention, the following effects can be achieved. If the temperature of the exhaust gas flowing into the DPF reaches the self-burning temperature of PM or above, the differential pressure increasing rate and the NOx purification rate are monitored. When this monitoring detects that the differential pressure tends to be increasing and the PM accumulation amount is increasing although the self-ignition range of PM is brought about, the richness is reduced. Thus, accumulation of PM can be prevented. Moreover, when the differential pressure increasing rate and the NOx purification rate are monitored, and this monitoring detects that the NOx purification rate is low although the differential pressure tends to be decreasing, the NOx purification rate can be increased by increasing the richness.

Therefore, in the engine operating state at such a high load range that the PM is self-ignited, it is possible to perform an optimum richness control capable of suppressing accumulation of the PM while maintaining an optimum NOx purification rate.

DESCRIPTION OF THE PREFERRED EMBODIMENTS

With reference to the drawings, an exhaust gas cleaning method and an exhaust gas cleaning system according to embodiments of the present invention will be described below.

Figure 1:
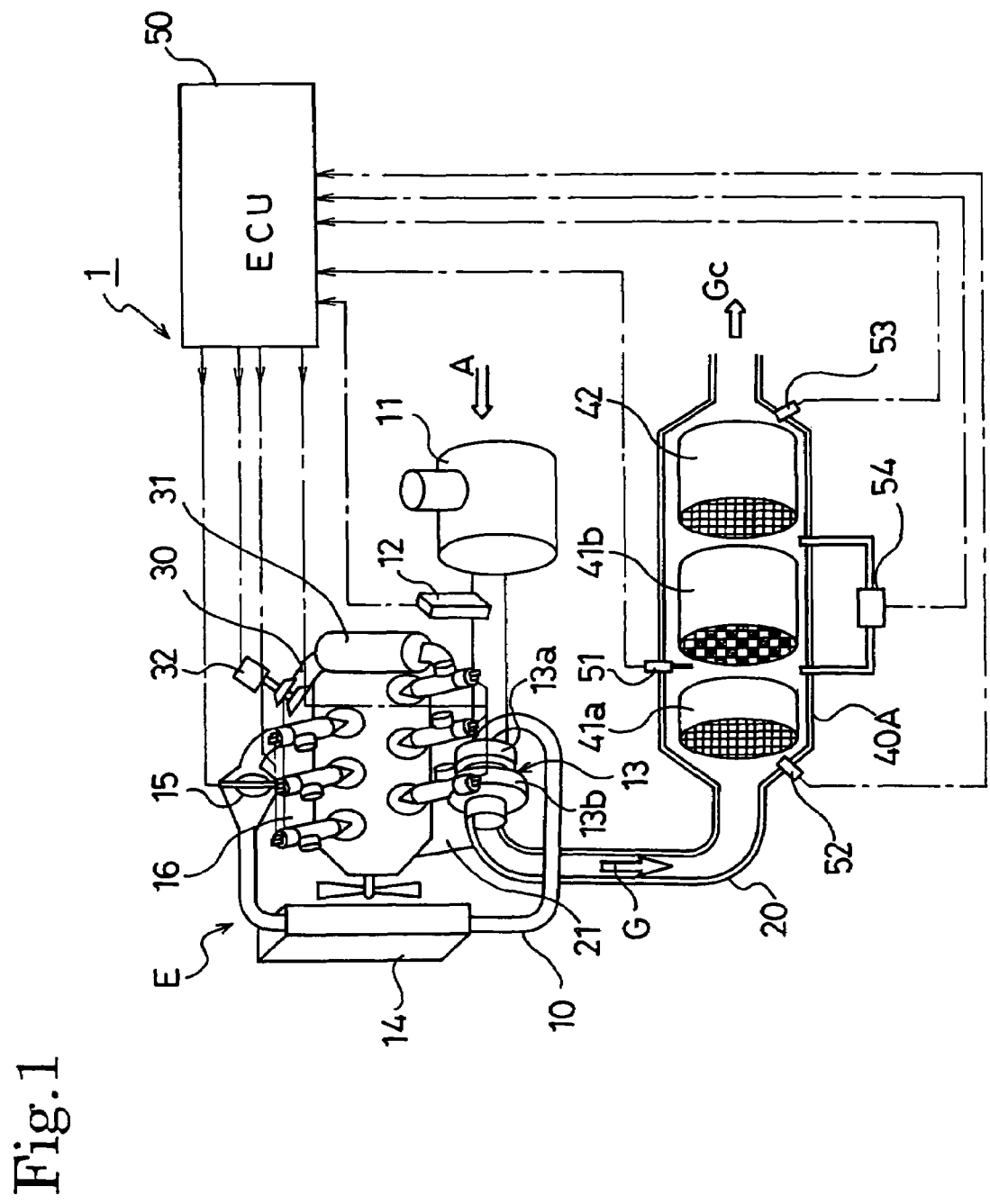
FIG. 1 is a view showing a configuration of an exhaust gas cleaning system of embodiments according to the present invention.

FIG. 1 shows a configuration of an exhaust gas cleaning system 1 of embodiments. This exhaust gas cleaning system 1 includes an exhaust gas cleaning device 40A in which an oxidation catalyst (DOC) 41a, a DPF 41b and an NOx occlusion/reduction type catalytic converter 42 are sequentially arranged from the upstream in an exhaust passage 20 of an engine (internal combustion engine) E. A continuous regeneration type DPF 41 is formed of the oxidation catalyst 41a located at the upstream side and the DPF 41b located at the downstream side.

The oxidation catalyst 41a is formed of a monolith catalyst having a number of polygonal cells. The monolith catalyst is a structural material made of cordierite, SiC or stainless steel. On an inner wall of the polygonal cell, a catalyst coat layer is provided, which accounts for a large surface area. On the large surface of the catalyst coat layer, catalytic metal such as platinum and vanadium is carried. The oxidation catalyst 41a causes its catalytic function by carrying the catalytic metal. The catalytic function can change NO in exhaust gas into $NO_2$ by an oxidation reaction ($NO+O \rightarrow NO_2$).

Moreover, the DPF 41b can be formed of a monolith honeycomb wall flow type filter in which an inlet and an outlet of a porous ceramic honeycomb channel are alternately sealed, a felt-like filter in which inorganic fibers such as alumina are randomly laminated, and the like. The filters described above collect PM in the exhaust gas. By combining the DPF 41b with the above-mentioned oxidation catalyst 41a at the upstream side, the collected PM is burnt and removed by $NO_2$ having a high oxidation capacity.

The NOx occlusion/reduction type catalytic converter 42 is formed of a monolith catalyst as in the case of the oxidation catalyst 41a. Moreover, in the catalytic converter 42, a catalyst coat layer is provided on a carrier such as aluminum oxide and titanium oxide. On the catalyst coat layer, a noble metal oxidation catalyst such as platinum, and an NOx occlusion material (NOx occlusion substance) such as barium are carried.

In the NOx occlusion/reduction type catalytic converter 42, NOx in the exhaust gas is purified by occluding NOx in the exhaust gas in an exhaust gas state with a high oxygen concentration (lean air fuel ratio state). Moreover, in an exhaust gas state with a low oxygen concentration or no oxygen (rich air fuel ratio state), the occluded NOx is released and the released NOx is reduced. By the actions described above, NOx is prevented from flowing out into the atmosphere.

Moreover, a temperature sensor 51 is provided at the upstream side of the DPF 41b. In the front and back of the NOx occlusion/reduction type catalytic converter 42, a first NOx concentration sensor 52 and a second NOx concentration sensor 53 are provided. In FIG. 1, these sensors 51 and 53 are provided in the vicinities of an inlet and an outlet of the exhaust gas cleaning device 40A, respectively. Furthermore, in order to estimate an amount of PM accumulated, a differential pressure sensor 54 which detects a difference $\Delta P$ in an exhaust gas pressure across the DPF is provided in a conducting pipe connected to front and back of the DPF 41b (or front and back of the exhaust gas cleaning device 40A). Note that an exhaust gas concentration sensor that is a sensor formed by integrating a $\lambda$ (excess air ratio) sensor, an NOx concentration sensor and an $O_2$ concentration sensor is usually used in place of the NOx concentration sensors 52 and 53 described above.

Output values of the sensors described above are inputted to a control unit (ECU: engine control unit) 50. The control unit 50 performs a general control of an operation of the engine E as well as a regenerative control of the continuous regeneration type DPF 41 and a recovery control of an NOx purification ability of the NOx occlusion/reduction type catalytic converter 42. Moreover, a control signal outputted from the control unit 50 controls a common-rail electronically-controlled fuel-injection device for fuel injection of the engine E, a throttle valve 15, an EGR valve 32, and the like.

Moreover, the control unit 50 calculates an NOx purification rate RNOx (=1.0–CNOx2/CNOx1) from detection values CNOx1 and CNOx2 of the first and second NOx concentration sensors 52 and 53. Moreover, a differential pressure increasing rate dP (=$\Delta P/dt$) is calculated from a differential pressure $\Delta P$ detected by the differential pressure sensor 54. Accordingly, an increase or a decrease in a PM accumulation amount of the DPF 41b is estimated.

In the exhaust gas cleaning system 1 described above, air A passes an air cleaner 11, a mass air flow (MAF) sensor 12, a compressor 13a of a turbo charger 13, an inter cooler 14, and the inlet throttle valve 15 in an inlet passage 10, and enters into a cylinder through an inlet manifold 16. Moreover, an amount of the air A is adjusted through the inlet throttle valve 15.

Then, exhaust gas G, which is generated in the cylinder, passes an exhaust manifold 21 and drives a turbine 13b of the turbo charger 13 in the exhaust passage 20. Thereafter, the exhaust gas G is turned into cleaned exhaust gas Gc after passing the exhaust gas cleaning device 40A, and is emitted into the atmosphere through an unillustrated muffler. Moreover, part of the exhaust gas G passes an EGR cooler 31 and the EGR valve 32 in an EGR passage 30 as EGR gas, and is recirculated into the inlet manifold 16. An amount of the EGR gas is adjusted through the EGR valve 32.

Figure 2:
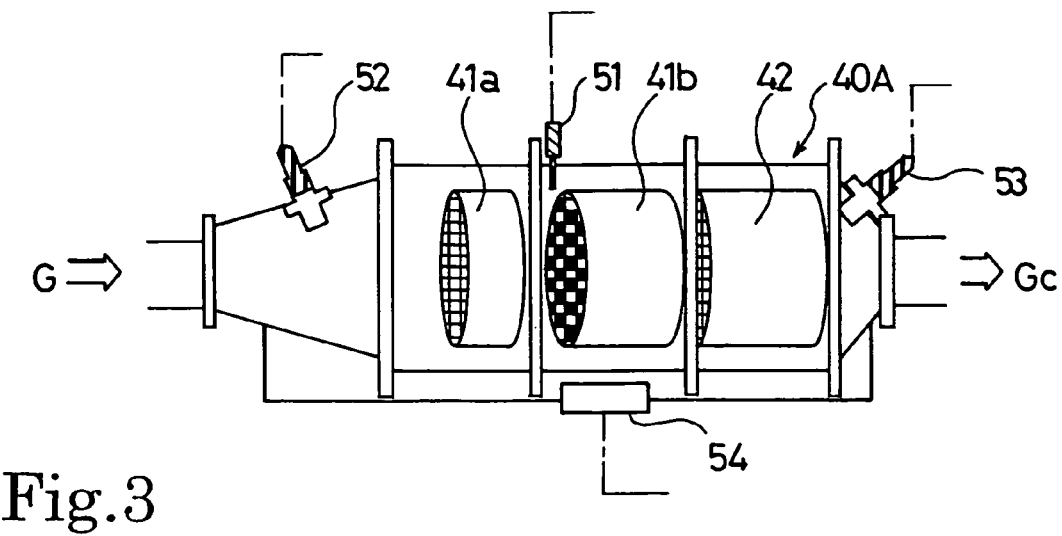
FIG. 2 is a view showing a configuration of an exhaust gas cleaning device of a first embodiment according to the present invention.
Figure 3:
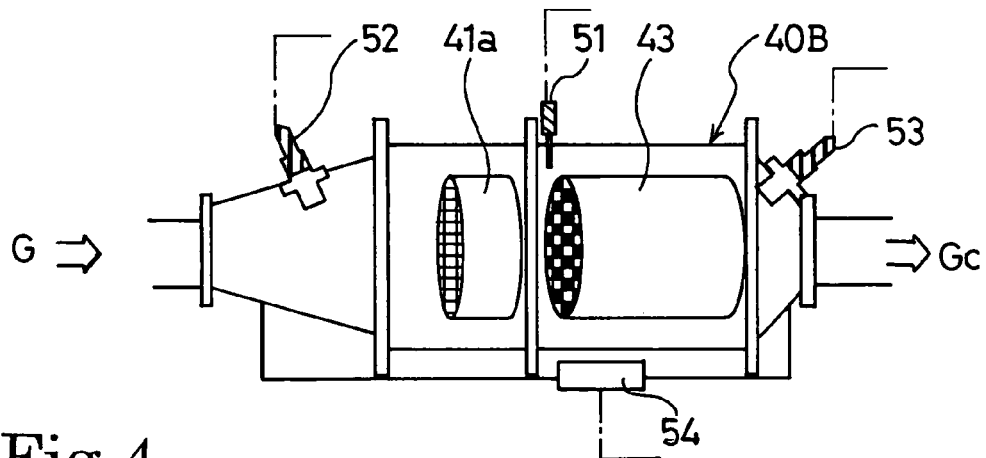
FIG. 3 is a view showing a configuration of an exhaust gas cleaning device of a second embodiment according to the present invention.
Figure 4:
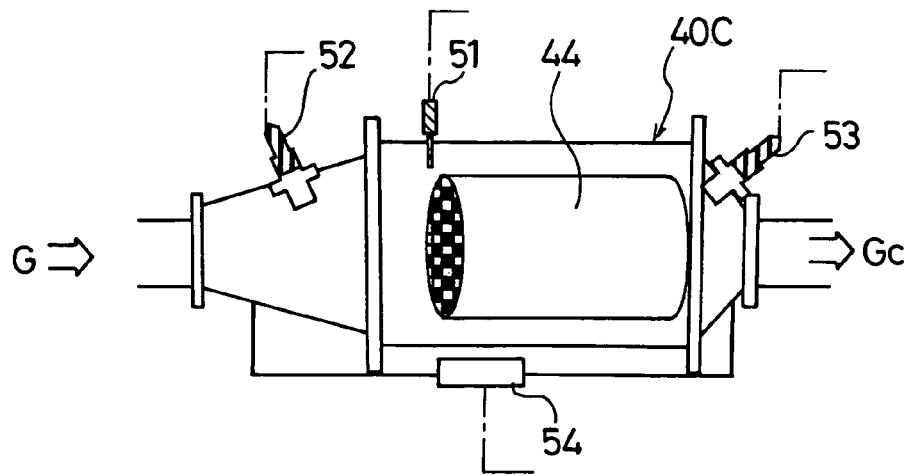
FIG. 4 is a view showing a configuration of an exhaust gas cleaning device of a third embodiment according to the present invention.

FIG. 2 shows a configuration of the exhaust gas cleaning device 40A. Moreover, FIGS. 3 and 4 show configurations of exhaust gas cleaning devices 40B and 40C of other embodiments, respectively. The exhaust gas cleaning device 40B shown in FIG. 3 includes an oxidation catalyst 41a and a DPF 43 carrying an NOx reduction type catalyst. The exhaust gas cleaning device 40C shown in FIG. 4 includes a DPF 44 with a catalyst, which carries an NOx reduction type catalyst. As the catalyst-provided DPF described above, there are a DPF carrying an oxidation catalyst and a DPF carrying both an oxidation catalyst and a PM oxidation catalyst.

The PM oxidation catalyst is a cerium (Ce) oxide or the like. In the case of a catalyst-carrying filter carrying both the PM oxidation catalyst and the oxidation catalyst, PM is oxidized by a reaction ($4CeO_2+C \rightarrow 2Ce_2O_3+CO_2$, $2Ce_2O_3+O_2 \rightarrow 4CeO_2$ and the like) which uses $O_2$ in the exhaust gas in the catalyst-carrying filter within a low temperature range (about 300° C. to 600° C.). Moreover, PM is oxidized by $O_2$ in the exhaust gas within a high temperature range (about 600° C. or higher). The high temperature range is higher than a temperature at which PM is burnt by $O_2$ in the exhaust gas Note that, in addition to the above, as an exhaust gas cleaning device without an oxidation catalyst at the uppermost side, there are: an exhaust gas cleaning device including a catalyst-provided DPF which carries an oxidation catalyst, and an NOx occlusion/reduction type catalytic converter; an exhaust gas cleaning device including a catalyst-provided DPF which carries both an oxidation catalyst and a PM oxidation catalyst, and an NOx occlusion/reduction type catalytic converter; and the like.

To sum up, the exhaust gas cleaning device of the present invention may be one which performs NOx purification by the NOx occlusion/reduction type catalyst and PM purification by the continuous regeneration type DPF for the exhaust gas from the internal combustion engine.

Figure 5:
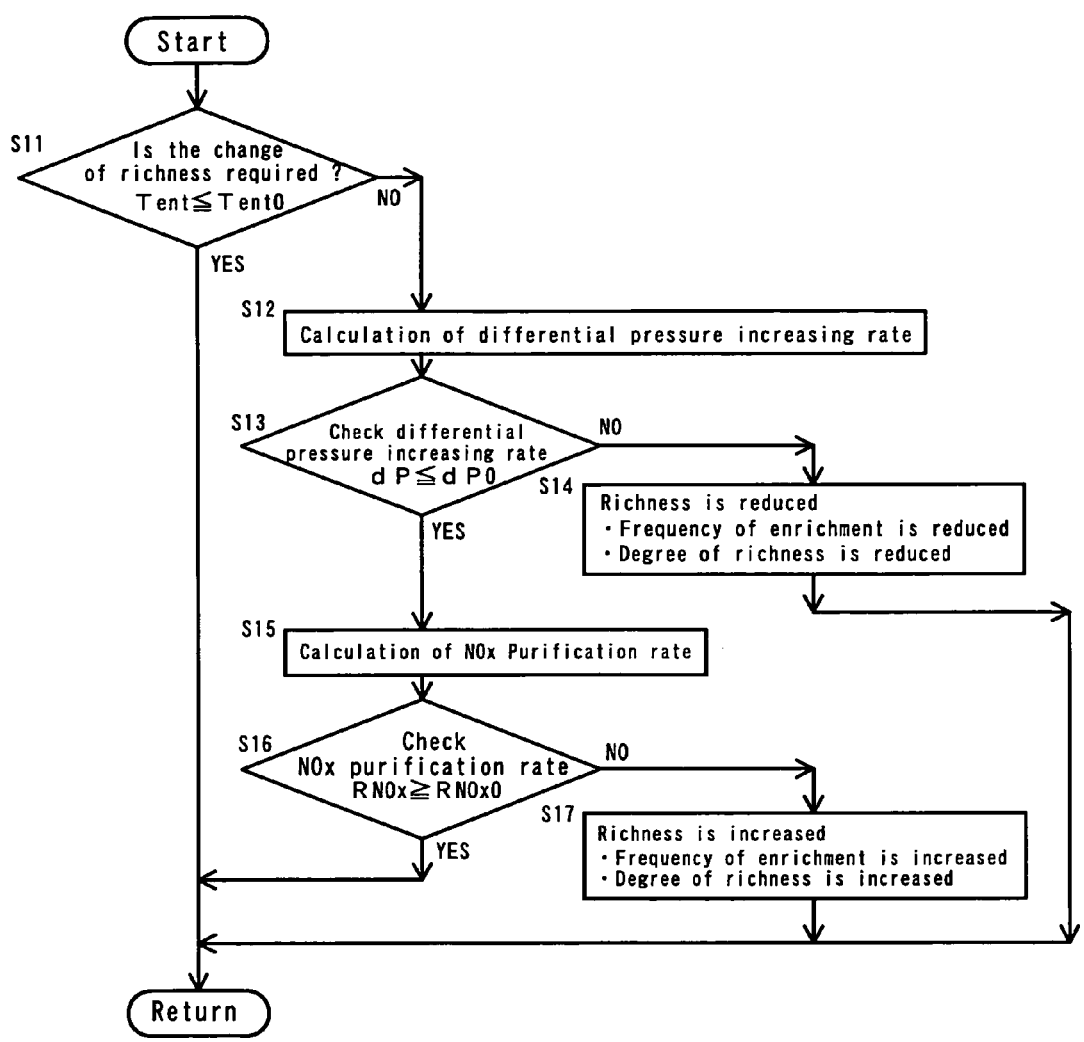
FIG. 5 is a flowchart showing an example of a richness change control flow in an exhaust gas cleaning method of an embodiment according to the present invention.
Figure 6:
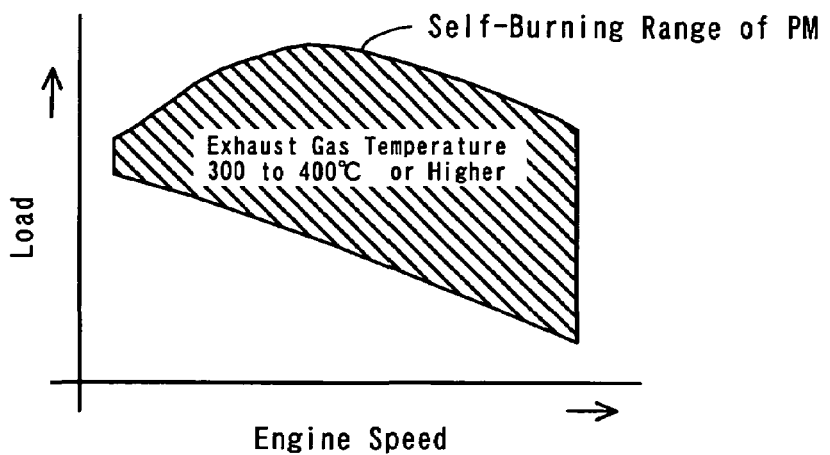
FIG. 6 is a graph showing an engine operating range in which PM is self-ignited.

In the exhaust gas cleaning system 1 described above, an exhaust gas cleaning method for performing an NOx regenerative control for recovering the NOx occlusion ability of the NOx occlusion/reduction type catalyst is carried out with a richness change control flow as shown in FIG. 5.

The control flow shown in FIG. 5 is a richness change control flow related to regeneration of the NOx occlusion/reduction type catalyst. The control flow shown here is repeatedly called up from a control flow of the entire exhaust gas cleaning system when a catalyst regenerative control is required, and changes settings of the richness (a frequency of enrichment, a degree of richness and the like) in the catalyst regenerative control if required.

When the above-described control flow is started, it is determined in Step S11 whether or not a change of the richness is required. When a DPF entrance exhaust gas temperature Tent detected by the temperature sensor 51 is not more than a specified determination value Tent0, it is determined that no change of the richness is required, and the flow is returned. Moreover, when the DPF entrance exhaust gas temperature Tent is not less than the specified determination value Tent0, it is determined that a change of the richness is required, and the flow advances to Step S12. The specified determination value Tent0 is a temperature for determining whether or not the exhaust gas temperature is in a range within which PM is self-ignited, that is, a self-burning temperature of PM. The specified determination value Tent0 is normally set to be between 300° C. and 400° C.

In Step S12, a differential pressure increasing rate dP is calculated. The differential pressure increasing rate dP is an increasing rate per unit time of a differential pressure ΔP across the DPF, which is detected by the differential pressure sensor 54. In the next Step S13, it is determined whether or not the differential pressure increasing rate dP exceeds a specified determination value dP0 of the differential pressure increasing rate. The specified determination value dP0 of the differential pressure increasing rate is a value for determining whether or not a PM accumulation amount is increased. The value dP0 is read from a standard differential pressure table corresponding to an increase in temperature.

When it is determined in Step S13 that the differential pressure increasing rate dP is not less than the specified determination value dP0 of the differential pressure increasing rate, the setting conditions of richness in a richness control are changed so as to reduce the richness in Step S14, and the flow is returned. The reduction in the richness is performed either by reducing the frequency of enrichment or by reducing the degree of richness. Specifically, the frequency of enrichment is reduced through making an interval longer than that in the previous richness control, and the degree of richness is reduced through setting a target oxygen concentration to be high in performing the richness control to obtain a high air fuel ratio of the exhaust gas. Alternatively, the richness is reduced both by reducing the frequency of enrichment and by reducing the degree of richness.

When it is determined in Step S13 that the differential pressure increasing rate dP is not more than the specified determination value dP0 of the differential pressure increasing rate, the flow advances to Step S15. In Step S15, an NOx purification rate RNOx (=1.0−CNOx2/CNOx1) in the exhaust gas cleaning devices 40A to 40C is calculated from NOx concentrations CNOx1 and CNOx2. The NOx concentration CNOx1 is detected by the first NOx concentration sensor 52, and the NOx concentration CNOx2 is detected by the second NOx concentration sensor 53.

Figure 7:
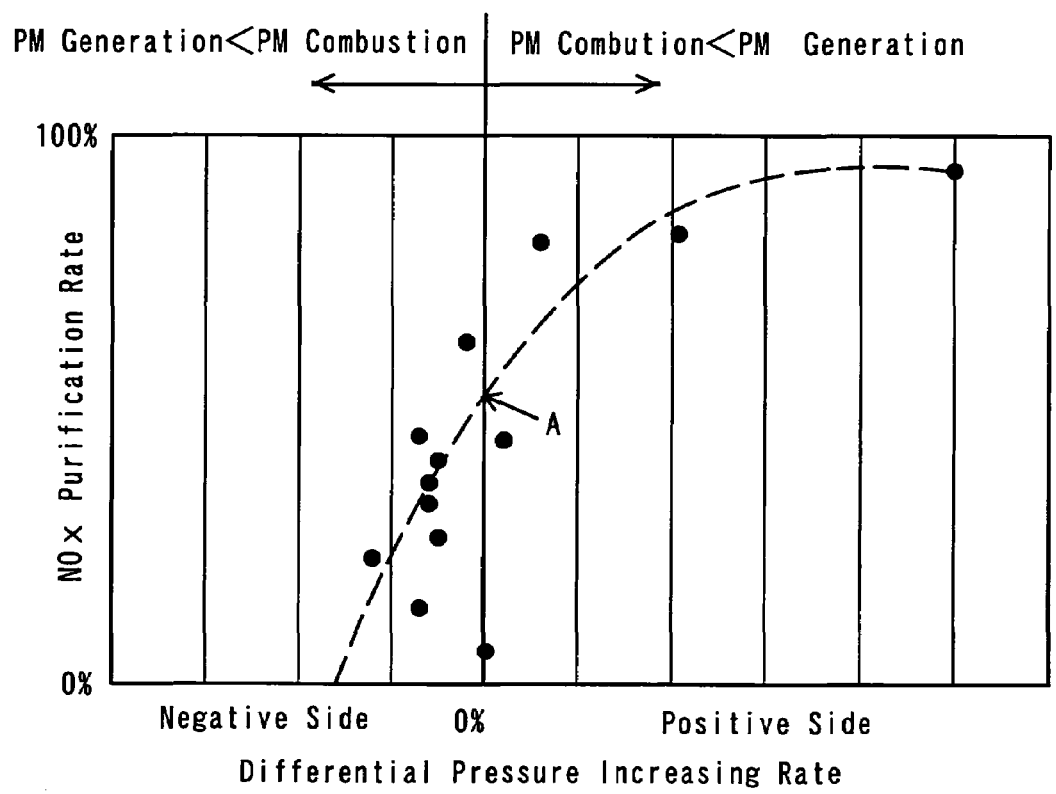
FIG. 7 shows a relationship between an NOx purification rate and a PM accumulation amount in the range within which PM is self-ignited.

In the next Step S16, it is determined whether or not the NOx purification rate RNOx is less than a specified determination value RNOx0 of the NOx purification rate. The specified determination value RNOx0 of the NOx purification rate is a value for determining whether or not a specified NOx purification ability is maintained. The value RNOx0 is set to be a value of a point A in FIG. 7 indicating an optimum NOx purification rate without accumulation of PM or to be a target value obtained by a test conducted beforehand.

When it is determined in Step S16 that the NOx purification rate RNOx is below the specified determination value RNOx0 of the NOx purification rate, the setting conditions of richness in the richness control are changed so as to increase the richness in Step S17, and the flow is returned. The increase in the richness is performed either by increasing the frequency of enrichment or by increasing the degree of richness. Specifically, the frequency of enrichment is increased through making an interval shorter than that in the previous richness control, and the degree of richness is increased through setting the target oxygen concentration to be low in performing the richness control and setting a low air fuel ratio of the exhaust gas. Alternatively, the richness is increased both by increasing the frequency of enrichment and by increasing the degree of richness.

Moreover, when it is determined in Step S16 that the NOx purification rate RNOx is not less than the specified determination value RNOx0 of the NOx purification rate, the flow is returned without any change of richness, that is, with a standard richness.

By the richness change control, if the DPF entrance exhaust gas temperature Tent is not less than the specified determination value (the self-burning temperature of PM) Tent0, the following control is performed. When the differential pressure increasing rate dP is not less than the specified determination value dP0 for the differential pressure increasing rate, a change to reduce the richness is made. Moreover, when the differential pressure increasing rate dP is less than the specified determination value dP0 of the differential pressure increasing rate and when the NOx purification rate RNOx is less than the specified determination value RNOx0 of the NOx purification rate, a change to increase the richness is made. In other cases, the flow is returned with the standard richness without changing the richness.

Therefore, if the DPF entrance exhaust gas temperature Tent is not less than the self-burning temperature Tent0 of PM, that is, enters the self-ignition range of PM, the following control is performed. When the differential pressure increasing rate dP and the NOx purification rate RNOx are monitored and it is determined, despite the self-ignition range of PM, that the differential pressure ΔP tends to be increasing and the PM accumulation amount is increasing, accumulation of PM can be prevented by reducing the richness. Thus, a state where richness is excessive and a large amount of PM is generated is improved. Moreover, on the contrary, if the differential pressure ΔP tends to be decreasing and the NOx purification rate RNOx is low, the NOx purification rate RNOx can be increased by increasing the richness. Thus, a state where richness is inadequate and regeneration of the NOx occlusion/reduction type catalyst is insufficient is improved.

Note that, in the case where the DPF entrance exhaust gas temperature Tent is below the self-burning temperature of PM or in the case where the NOx purification rate RNOx is high even though the DPF entrance exhaust gas temperature Tent is within the self-ignition range of PM and where the differential pressure ΔP tends to be decreasing, a richness control operation for regenerating the NOx occlusion/reduction type catalyst is performed with the standard richness without changing the richness.

Additionally, in the richness control operation described above, a combustion state of the engine E is temporarily changed based on the frequency of enrichment and the target oxygen concentration. Specifically, a HC (such as a fuel) reducing agent is supplied to the exhaust gas by post injection, injection within an exhaust pipe, or the like, thereby causing the exhaust gas to be in a rich air fuel ratio state, that is, a state with a low $O_2$ concentration, a high CO concentration, and a high temperature. Thus, the occluded NOx is release from the NOx occlusion material of the NOx occlusion/reduction type catalyst, and the occlusion ability is recovered. Moreover, by catalysis of the oxidation catalyst, the released NOx is reduced to $N_2$ and $H_2O$ with reducing agents such as HC and CO which exist in the exhaust gas.

The richness control that is the regenerative control of the NOx occlusion/reduction type catalyst can be performed with the richness corresponding to the respective operating states of the engine. Thus, NOx and PM in the exhaust gas can be purified in a well-balanced manner.

INDUSTRIAL APPLICABILITY

The present invention is intended to provide an exhaust gas cleaning method capable of maintaining an optimum NOx purification rate in a continuously regenerative range of DPF in an exhaust gas cleaning system having an NOx purification function by an NOx occlusion/reduction type catalyst and a PM purification function by a continuous regeneration type DPF combined with each other and to provide the exhaust gas cleaning system.

Therefore, the present invention can be utilized in the exhaust gas cleaning system having the NOx purification function through the NOx occlusion/reduction type catalyst and the PM purification function through the continuous regeneration type DPF combined with each other. Moreover, it is possible to efficiently purify exhaust gas from a vehicle or the like which is equipped with the exhaust gas cleaning system, and to prevent air pollution.

What is claimed is:

1. An exhaust gas cleaning method in an exhaust gas cleaning system which performs NOx purification by an NOx occlusion/reduction type catalyst and PM purification by a continuous regeneration type DPF for exhaust gas from an internal combustion engine, and includes a temperature sensor which detects a temperature of the exhaust gas flowing into the DPF, a differential pressure sensor which detects a differential pressure across the DPF, first and second NOx concentration sensors which detect NOx concentrations across the NOx occlusion/reduction type catalyst, and a control unit which calculates a differential pressure increasing rate per unit time of the DPF and calculates an NOx purification rate from the NOx concentrations across the NOx occlusion/reduction type catalyst, the method comprising:

reducing richness in a richness control performed in a catalyst regenerative control for regenerating the NOx occlusion/reduction type catalyst when: the temperature of the exhaust gas detected by the temperature sensor is not less than a self-burning temperature of PM, and the differential pressure increasing rate is not less than a specified determination value thereof; and increasing richness in a richness control performed in a catalyst regenerative control for regenerating the NOx occlusion/reduction type catalyst when: the temperature of the exhaust gas detected by the temperature sensor is not less than a self-burning temperature of PM, the differential pressure increasing rate is not more than a specified determination value thereof, and the NOx purification rate is less than a specified determination value thereof.

2. The exhaust gas cleaning method according to claim 1, wherein the richness is reduced in the richness control performed in the catalyst regenerative control for regenerating the NOx occlusion/reduction type catalyst when: the temperature of the exhaust gas detected by the temperature sensor is not less than the self-burning temperature of PM; and the differential pressure increasing rate is not less than the specified determination value thereof.

3. An exhaust gas cleaning system which performs NOx purification by an NOx occlusion/reduction type catalyst and PM purification by a continuous regeneration type DPF for exhaust gas from an internal combustion engine, comprising:

a temperature sensor which detects a temperature of the exhaust gas flowing into the DPF;

a differential pressure sensor which detects a differential pressure across the DPF;

first and second NOx concentration sensors which detect NOx concentrations across the NOx occlusion/reduction type catalyst; and a control unit which calculates a differential pressure increasing rate per unit time of the DPF and calculates an NOx purification rate from the NOx concentrations across the NOx occlusion/reduction type catalyst, wherein the control unit reduces richness of the exhaust gas in a richness control performed in a catalyst regenerative control for regenerating the NOx occlusion/reduction type catalyst when the temperature of the exhaust gas detected by the temperature sensor is not less than a self-burning temperature of PM; and the differential pressure increasing rate is not less than a specified determination value thereof, and the control unit increases richness of the exhaust gas in a richness control performed in a catalyst regenerative control for regenerating the NOx occlusion/reduction type catalyst when: the temperature of the exhaust gas detected by the temperature sensor is not less than a self-burning temperature of PM, the differential pressure increasing rate is not more than a specified determination value thereof, and the NOx purification rate is less than a specified determination value thereof.

4. The exhaust gas cleaning system according to claim 3, wherein the control unit reduces the richness in the richness control performed in the catalyst regenerative control for regenerating the NOx occlusion/reduction type catalyst when: the temperature of the exhaust gas detected by the temperature sensor is not less than the self-burning temperature of PM; and the differential pressure increasing rate is not less than the specified determination value thereof.

5. The exhaust gas cleaning system according to claim 3, wherein the continuous regeneration type DPF is any one of: a continuous regeneration type DPF formed of an oxidation catalyst at the upstream side and a DPF at the downstream side; a continuous regeneration type DPF formed of a catalyst-provided DPF which carries an oxidation catalyst; and a continuous regeneration type DPF formed of a catalyst-provided DPF which carries both of an oxidation catalyst and a PM oxidation catalyst.

6. The exhaust gas cleaning system according to claim 3, wherein the said exhaust gas cleaning system is any one of an exhaust gas cleaning system including an NOx reduction type catalytic converter and a continuous regeneration type DPF in an exhaust passage of the internal combustion engine, and an exhaust gas cleaning system including a continuous regeneration type DPF having a DPF carrying an NOx reduction type catalyst.

7. The exhaust gas cleaning system according to claim 3, wherein the continuous regeneration type DPF is any one of: a continuous regeneration type DPF formed of an oxidation catalyst at the upstream side and a DPF at the downstream side; a continuous regeneration type DPF formed of a catalyst-provided DPF which carries an oxidation catalyst; and a continuous regeneration type DPF formed of a catalyst-provided DPF which carries both of an oxidation catalyst and a PM oxidation catalyst.

8. The exhaust gas cleaning system according to claim 4, wherein the continuous regeneration type DPF is any one of: a continuous regeneration type DPF formed of an oxidation catalyst at the upstream side and a DPF at the downstream side; a continuous regeneration type DPF formed of a catalyst-provided DPF which carries an oxidation catalyst; and a continuous regeneration type DPF formed of a catalyst-provided DPF which carries both of an oxidation catalyst and a PM oxidation catalyst.

9. The exhaust gas cleaning system according to claim 3, wherein the said exhaust gas cleaning system is any one of an exhaust gas cleaning system including an NOx reduction type catalytic converter and a continuous regeneration type DPF in an exhaust passage of the internal combustion engine, and an exhaust gas cleaning system including a continuous regeneration type DPF having a DPF carrying an NOx reduction type catalyst.

10. The exhaust gas cleaning system according to claim 4, wherein the said exhaust gas cleaning system is any one of an exhaust gas cleaning system including an NOx reduction type catalytic converter and a continuous regeneration type DPF in an exhaust passage of the internal combustion engine, and an exhaust gas cleaning system including a continuous regeneration type DPF having a DPF carrying an NOx reduction type catalyst.

11. The exhaust gas cleaning system according to claim 5, wherein the said exhaust gas cleaning system is any one of an exhaust gas cleaning system including an NOx reduction type catalytic converter and a continuous regeneration type DPF in an exhaust passage of the internal combustion engine, and an exhaust gas cleaning system including a continuous regeneration type DPF having a DPF carrying an NOx reduction type catalyst.

12. An exhaust gas cleaning method for an internal combustion engine including an NOx occlusion/reduction type catalyst and a continuous regeneration type DPF to perform PM purification, comprising:

detecting a temperature of exhaust gas flowing into the continuous regeneration type DPF;

detecting a differential pressure across the DPR;

calculating a differential pressure increasing rate per unit time of the DPF; and reducing or increasing richness in a richness control performed in a catalyst regenerative control for regenerating the NOx occlusion/reduction type catalyst based on whether the detected temperature is less than a self-burning temperature of PM and whether the calculated differential pressure increasing rate is less than or more than a specified determination value thereof.

13. The exhaust gas cleaning method according to claim 12, wherein richness in the richness control is reduced when the detected temperature is not less than the self-burning temperature of PM and the differential pressure increasing rate is not less than the specified determination value thereof.

14. The exhaust gas cleaning method according to claim 12, wherein richness in the richness control is increased when the detected temperature is not less than the self-burning temperature of PM and the differential pressure increasing rate is not more than the specified determination value thereof, and the NOx purification rate is less than a specified value thereof.

* * * * *